United States Patent
Palamara et al.

(10) Patent No.: US 7,970,398 B2
(45) Date of Patent: Jun. 28, 2011

(54) METHOD AND APPARATUS FOR PROVISIONING AND AUTHENTICATION/REGISTRATION FOR FEMTOCELL USER ON IMS CORE NETWORK

(75) Inventors: Maria E. Palamara, Denville, NJ (US); Robin Jeffrey Thompson, Batavia, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 912 days.

(21) Appl. No.: 11/767,722

(22) Filed: Jun. 25, 2007

(65) Prior Publication Data

US 2008/0318551 A1    Dec. 25, 2008

(51) Int. Cl.
H04M 1/66    (2006.01)

(52) U.S. Cl. .............. 455/435.1; 455/411; 455/433

(58) Field of Classification Search .......... 455/410–411, 455/435.1–444; 370/328–338; 380/247–250
See application file for complete search history.

(56) References Cited

U.S. PATENT DOCUMENTS

| | | | |
|---|---|---|---|
| 6,192,250 B1 | 2/2001 | Buskens et al. | |
| 6,377,799 B1 | 4/2002 | Hameleers et al. | |
| 6,453,162 B1 * | 9/2002 | Gentry | 455/433 |
| 7,145,890 B1 | 12/2006 | Seo et al. | |
| 7,408,896 B2 | 8/2008 | Chen et al. | |
| 7,471,950 B1 | 12/2008 | Oh et al. | |
| 7,652,984 B1 | 1/2010 | Kotecha | |
| 2004/0125758 A1 | 7/2004 | Hayduk | |
| 2004/0246990 A1 | 12/2004 | Krishnamurthi et al. | |
| 2006/0120355 A1 | 6/2006 | Zreiq et al. | |
| 2006/0129646 A1 | 6/2006 | Rhee et al. | |
| 2006/0206504 A1 * | 9/2006 | Cai et al. | 707/100 |
| 2006/0268900 A1 | 11/2006 | Larsson et al. | |
| 2006/0291419 A1 | 12/2006 | McConnell et al. | |
| 2007/0002844 A1 | 1/2007 | Ali | |
| 2007/0043947 A1 * | 2/2007 | Mizikovsky et al. | 713/172 |
| 2007/0165612 A1 * | 7/2007 | Buckley | 370/356 |
| 2007/0206563 A1 | 9/2007 | Silver et al. | |
| 2007/0213067 A1 | 9/2007 | Li et al. | |
| 2008/0020771 A1 | 1/2008 | Trayer | |
| 2008/0063159 A1 * | 3/2008 | Pounds | 379/90.01 |

(Continued)

FOREIGN PATENT DOCUMENTS

CN    1852553 A  * 10/2006

(Continued)

OTHER PUBLICATIONS

PCT/US2008/007833, PCT International Search Report; Nov. 4, 2008 (5 pages).

(Continued)

*Primary Examiner* — Kent Chang
*Assistant Examiner* — Kashif Siddiqui
(74) *Attorney, Agent, or Firm* — Fay Sharpe LLP

(57) ABSTRACT

A method for provisioning, registering and authenticating a mobile phone on a basestation is provided. The method includes receiving an addition request for the addition of a mobile station to a basestation authorization record via an interface. The method continues with creating an entry for the mobile station, where the entry includes mobile station information, and receiving a registration request including request information from the mobile station to register to receive basestation based services via the associated internet multimedia subsystem network. The method also includes authorizing registration on the IMS network based at least in part on the request information.

20 Claims, 4 Drawing Sheets

U.S. PATENT DOCUMENTS

| | | | |
|---|---|---|---|
| 2008/0064369 A1* | 3/2008 | Xie et al. | 455/411 |
| 2008/0101301 A1 | 5/2008 | Thomas et al. | |
| 2008/0132239 A1 | 6/2008 | Khetawat et al. | |

FOREIGN PATENT DOCUMENTS

| | | |
|---|---|---|
| EP | 1798896 A1 | 6/2007 |
| JP | 2007060181 | 3/2007 |
| WO | 2005/099185 A1 | 10/2005 |
| WO | 2007/015068 A1 | 2/2007 |
| WO | 2007038961 A1 | 4/2007 |
| WO | 2007045264 A1 | 4/2007 |
| WO | 2008/055251 A2 | 5/2008 |

OTHER PUBLICATIONS

PCT/US2008/007833, PCT Written Opinion of the International Searching Authority; Nov. 4, 2008 (6 pages).

"Digital cellular telecommunications system (Phase 2+); Universal Mobile Telecommunications System (UMTS); IP Multimedia Subsystem (IMS) Sh interface; Signaling flows and message contents (3GPP TS 29.328 version 7.6.0. Release 7)" Jun. 1, 2007 (44 pages).

MGCF Interfaces (IMS-PSTN(ISUP) Call: Megaco/H.248 Signaling; IMS Customer Initiated Call Release). EventStudio System Designer 4.0, Feb. 25, 2008 (3 pages).

Mani et al.: "Access to IP Multimedia System of UMTS via Packet Cable Network" Wireless Communications and Networking Conference, 2005 IEEE New Orleans, LA, USA, Mar. 13-17, 2005, Piscataway, NJ, US Mar. 13-17, 2005 (Mar. 13, 2005), pp. 2459-2465.

Sun et al.: "A SIP-Enabled All-IP Architecture for Converged Next-Generation Networks", Bell Labs Technical Journal, Wiley, CA, US; vol. 9, No. 3; Nov. 8, 2004, pp. 15-37.

Airvana: "Network Architecture for cdma2000 Femto and Pico Cell Applications to Special Radio Environments" [Online] May 2, 2007, pp. 1, 3-12.

Tatara Systems: "Tatara Convergence Server Datasheet" [Online] 2006, pp. 1-2.

ICS Architecture—IMS CS Control Channel (ICCC), 3GPP TSG WG2 Architecture—S2 R8 Ad Hoc, S2-070672, St. Louis, MO, Feb. 12-15, 2007, 2 pages.

Patent Abstracts of Japan, English translation of Japanese Patent Application JP 2007-060181 (published Mar. 8, 2007) using Japanese Patent Office web site, generated and printed Jan. 23, 2009, 15 pages.

* cited by examiner

METHOD AND APPARATUS FOR PROVISIONING AND AUTHENTICATION/REGISTRATION FOR FEMTOCELL USER ON IMS CORE NETWORK

CROSS REFERENCE TO RELATED PATENTS AND APPLICATIONS

This application is related to U.S. application Ser. No. 11/758,477, filed Jun. 5, 2007, entitled METHOD AND APPARATUS TO ALLOW HAND-OFF FROM A MACROCELL TO A FEMTOCELL, Inventors John Kenney Burgess and Robin Jeffrey Thompson; U.S. application Ser. No. 11/758,555, filed Jun. 5, 2007, entitled SESSION INITIATION PROTOCOL/INTERNET PROTOCOL MULTIMEDIA SUBSYSTEM BASED ARCHITECTURE FOR SUPPORTING 3G1x VOICE/DATA, Inventors John Kenney Burgess, Andrew C. Clark, James Ray Freeburg, Hoo Dennis Ong, Maria E. Palamara, K. Jeffrey Rabourn, Robin Jeffrey Thompson and Alex Lawrence Wierzbicki; U.S. Ser. No. 11/758,557, filed Jun. 5, 2007, entitled METHOD TO ALLOW HAND-OFF OF A CDMA MOBILE FROM IMS FEMTOCELL TO CIRCUIT MSC, Inventor Robin Jeffrey Thompson; U.S. application Ser. No. 11/767,828, filed Jun. 25, 2007, entitled A METHOD AND APPARATUS FOR SIGNALING INTERWORKING CDMA 3G1x MOBILES AND EVDO MOBILES WITH AN IMS CORE NETWORK, Inventors Robin Jeffrey Thompson and Alex Lawrence Wierzbicki. These applications are hereby incorporated herein by reference.

BACKGROUND OF THE DISCLOSURE

This disclosure relates to a method and apparatus for supporting and converting a signal from one network to another. More particularly, this disclosure relates to a method and apparatus for provisioning and registering traditional, e.g. non-Internet protocol Multimedia Subsystem (IMS) compatible, Code Division Multiple Access (CDMA) mobile telephones for a basestation on the IMS network.

While the disclosure is particularly directed towards telecommunication architecture and thus will be described with specific reference thereto, it will be appreciated that the disclosure may have usefulness in other fields and applications. For example, this disclosure may be used in a variety of data transfer systems in order to support provisioning and authentication of mobile networks onto IMS core networks. This technology will allow service providers to invest their energy in future IMS technology.

By way of background, CDMA mobiles are in use all over the world. Many people use these handsets in order to transfer voice and/or data through a well established radio network. Currently, there are many methods for provisioning, authenticating and registering CDMA mobiles onto the CDMA radio network.

The IMS/Session Initiation Protocol (SIP) based network is an internet based network that supports many other types of handsets. These handsets use Voice over Internet Protocol (VoIP) and other methods to transfer data and voice in real time applications across the Internet Protocol (IP) network. Although the IMS network architecture is less commonly used in order to transfer voice at this time, it is gaining popularity over many other alternatives for future, or next generation, fixed and wireless networks.

Currently in the industry, there is no effective way to carry a signal intended for a traditional ANSI-41/CDMA network on an IMS network. The current systems in place only allow IP signals to be covered along the IP network. There is a need in the industry to allow IMS network coverage and capacity to be extended to signals originally intended to be transferred over other networks. There is further a need for the mobile stations carrying these signals to be provisioned, authenticated and registered on the IMS core network. There is also a need for an architecture that will allow this provisioning, authentication and registration to take place without requiring changes to the mobile station's interworkings. Furthermore, there is a need in the industry to supply data network to allow for IP awareness to take place on a mobile station originally intended for the CDMA network.

The present invention contemplates a new and improved system and method that resolves the above-referenced difficulties and others.

SUMMARY OF THE INVENTION

A method and apparatus for provisioning, authentication and registration for CDMA mobiles using a basestation for access to an IMS core network is provided. The disclosure will allow for provisioning of authorized handsets on the IMS network. The disclosure will also allow for authentication and registration of the CDMA handsets on an IMS core network. This disclosure will further allow for actual authentication to be performed on the legacy network Home Location Register/Authentication Center (HLR/AC). Furthermore this disclosure allows for automated provisioning on the IMS network and the interworking of a CDMA standard authentication/registration procedures via IMS architecture and SIP protocol.

In one aspect of the disclosure, a method for provisioning and registering for basestation users on an associated internet protocol multimedia subsystem network includes receiving a request for the addition of a mobile station to a basestation authorization record via an interface, creating an entry for the mobile station where the entry includes mobile station information and receiving an authentication registration request, including request information from the mobile station to register to receive basestation based services via the internet protocol multimedia subsystem, and authorizing registration on the associated internet protocol multimedia subsystem network for the mobile station based at least in part on the request information.

In another aspect of the present disclosure, the method includes that the mobile station information includes an electronic serial number for the mobile station.

In another aspect of the present disclosure, the method includes communicating the entry to servers that require independent subscriber data.

In accordance with another aspect of the present disclosure, the request information includes relevant information to assure proper call processing.

In accordance with another aspect of the present disclosure, the method includes that the basestation is a femto basestation.

In accordance with another aspect of the present disclosure, the method includes that the interface is a web portal.

In accordance with another aspect of the present disclosure, the method includes that authorizing registration includes implementing CAVE based authentication.

In accordance with another aspect of the present disclosure, the method includes validating the entry through a home location register.

In yet another aspect of the present disclosure, the method includes temporary provisioning.

In accordance with another aspect of the present disclosure, the method includes tracking an expiration date.

In accordance with another aspect of the present disclosure, the method includes implementing a timer function for provisioning.

In accordance with yet another aspect of the present disclosure, a system for provisioning and authenticating a mobile station for utilizing a basestation connected to a session initiation protocol based network includes a basestation configured to receive signals from an associated code division multiple access mobile and process calls through an internet protocol based network and a management server that creates an entry for the associated code division multiple access mobile where the entry will allow provisioning and facilitate registration requests for the associated code division multiple access mobile to access the basestation.

In accordance with another aspect of the present disclosure, the system includes a home subscriber server that stores the entry and filter criteria that allows session initiation protocol services for call processing.

In accordance with yet another aspect of the present disclosure, the system includes that the session initiation protocol services include hand-off services.

In accordance with another aspect of the present disclosure, the system includes that the base station be a femto base station.

In accordance with another aspect of the present disclosure, the system includes a home location register that houses subscriber information.

In accordance with another aspect of the present disclosure, the system includes an authentication center that facilitates authentication of the associated code division multiple access mobile station.

In yet another aspect of the present disclosure, a method for provisioning a registration of a mobile station on an internet protocol network comprises creating a secure data session between a user and a service provider, receiving a request from the user via the secure data session to add a mobile station to a list of mobile stations authorized to register on a basestation where the basestation is configured to facilitate the mobile station to be carried on a session initiation protocol based network creating a record authorizing the mobile station, receiving a request from the mobile station to register on the basestation and registering the mobile station if the mobile station meets predetermined registration criteria.

In accordance with another aspect of the present disclosure, the method includes registering the mobile station using a CAVE algorithm.

In accordance with another aspect of the present disclosure, the method includes that creating a record that is a temporary record for authorizing the mobile station.

DESCRIPTION OF THE DRAWINGS

The presently described embodiments exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
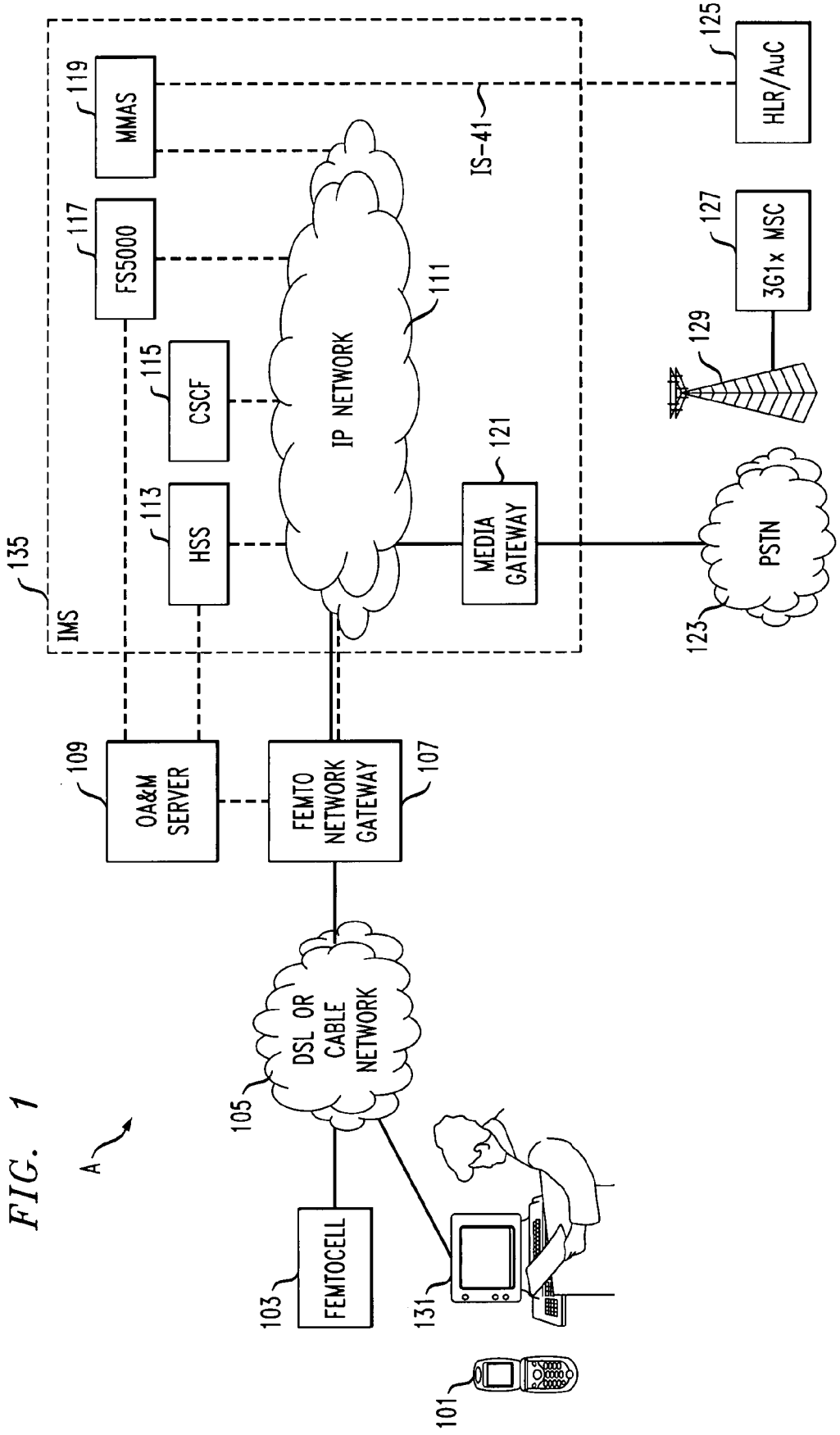
FIG. 1 illustrates a portion of the overall communication network including a base station, the broadband (e.g. cable or DSL) network, gateway, the IP network and a mobile station.

Referring now to the drawings wherein the showings are for purposes of illustrating the disclosed embodiments only and not for purposes of limiting the same, FIG. 1 provides an overall view of the system into which the present disclosure may be incorporated. A communications infrastructure A is shown. The communications infrastructure A includes a mobile station 101, a basestation 103, a Digital Subscriber Line (DSL) or cable provider network 105, a network gateway 107, an Operations Administration and Maintenance (OA & M) server 109, an IP network 111, a Home Subscriber System (HSS) 113, a Call Session Control Function (CSCF) 115, a Feature Server 5000 (FS5000) 117, a Mobility Management Application Server (MMAS) 119, a mobile gateway 121, a Public Switched Telephone Network (PSTN) 123, a HLR/AuC 125, a 3G1x Mobile Switching Center (MSC), and a receiving tower 129. It should be understood that this represents but one embodiment of a communications network infrastructure A, the present disclosure could be incorporated into a variety of communication network configurations.

In operation, as described in greater detail below, the presently described embodiments are directed towards provisioning and authentication and registration for basestation 103 user on the IMS 135 core network. In this sense, the disclosure describes a solution to the current problem which involves provisioning, registration and authentication for a CDMA 3G1x mobile station 101 through the IMS network 135. As wireless service providers plan on evolving their core network to IMS 135 in order to support other multimedia services, this development is important for registration and provisioning without tedious and error prone double provisioning in the HLR 125 and HSS 113 servers. This will also resolve the problem of the large embedded base of existing HLR 125 products that do not support the HSS 113 functionality or non-standard data interface to a separate HSS 113.

Still referring to FIG. 1, the system includes an associated CDMA 3G1x mobile station 101. As shown it may be connected to basestation 103. Basestation 103 and web portal user interface 131 are connected to the DSL or cable providers' network 105. In turn, the network would be connected to a network gateway 107 with an OA & M server 109 servicing it. Both and/or are in communication with the IMS 135.

The IMS network includes an HSS 113, and FS 5000 117, an MMAS 119, a CSCF 115, a media gateway 121 and the IP network 111. They are connected to the PSTN 123 through the media gateway 121 and basestation tower 129 is connected to the legacy based MSC 127. There are all in turn communication with the HLR AuC 125. Furthermore, all are in communication with the IP network 111.

Continuing on with FIG. 1, this embodiment includes mobile station 101 which is user equipment. However, other user equipment besides a mobile station shown may be substituted. Other examples of user equipment include, but are not limited to, wireless telephones, VoIP telephones, laptop computers, desktop computers, WiFi telephones, etc. These devices are typical user equipment and used to communicate through compatible lines. In this embodiment the mobile station 101 is a CDMA 3G1x handset.

Through this disclosure a call placed by the mobile station 101 may be processed using tower 129. In turn the call would transition through the legacy based MSC 127 and/or through the PSTN 123 to where the call would be connected. However, through this disclosure the call may also be within range of the basestation 103 and the call may be processed through the IMS network 135.

The basestation 103 may have two components, the basestation emulator and the SIP user agent. The base station emulator is configured to receive calls from a CDMA mobile and transfer the message to the SIP user agent. The SIP user agent will then communicate the signal to an associated IMS 135. In conjunction, the basestation emulator and SIP user agent translate the CDMA signal to a SIP signal to be processed by the IMS 135. It should be noted that the basestation 103 maybe a femto basestation, a macro basestation, etc.

Generally, in order for a call to take place, the mobile station carrying the call must be provisioned then authenticated and registered. Through this disclosure, provisioning may take place via a secure web portal interface. In order to accomplish this, the basestation owner may log on to a customer care portal at the service provider's website. Once there, the owner may choose the link which allow them to administer the basestation. The basestation service provider may then set up a secure data session between the basestation owner and the OA & M server 109.

The owner may then request to add a new mobile phone authorization to the basestation 103 in which case the service provider would then present a screen with an input section for each cell phone to be added. The information added may include a cell phone number, the International Mobile Subscriber Identity (IMSI), the mobile station owner's name, etc. Once the basestation owner populates the data on the entry spaces on the computer screen 131, the OA & M server 109 then create a local record authorizing the mobile station 101.

For added security and fraud prevention, this provisioning information could include the Electronic Serial Number (ESN) of the mobile stations 101 being added. At this point the OA & M server 109 could communicate with the MMAS 119 and request a mobile number/ESN validation check with the mobile station's HLR 125. As a check for added security and if the data entered does not correspond to the information stored in the HLR 125, provisioning may not take place. If provisioning does not succeed, then the mobile phone 101 which is trying to register, would not be allowed access. This is explained in further detail in FIG. 2.

Continuing on with FIG. 1, in the provisioning process the OA & M server 109 may then communicate with the HSS 113 using automatic provisioning script to create HSS subscriber record for each authorized mobile station 101. The script includes information that a new subscriber identity based on encapsulation of the corresponding mobile telephone number or IMSI along with the basestation identification number. The script would populate the HSS 113 with filter criteria that will allow the SIP services to work for their user. This filter criteria may include identification for the MMAS 119 identification for a hand-off application server which would handle hand-offs, a telephone application server identification and/or any other relevant information to assure appropriate call processing in the IMS 135.

The HSS 113 would then be authorized to return an acknowledgement for successful creation of record. In the alternative, if the creation was not successful, an error message may be sent from the HSS 113 back to the OA & M server 109. However, if the creation of record was successful, the OA & M 109 server may establish communication with additional 135 application servers that might need independent subscriber data. In this embodiment the FSS5000 117 may need such data. The FS5000 117 is used in order to provide telephony features such as call forwarding and three way calling. Using a provisioning script similar to the HSS 113 provisioning script, this information may be sent to all relevant application servers. These servers could include any server that does not support the Sh interface which allows an application server to communicate with the HSS 113 so that it can extract the necessary data in order to dispatch the logic of the service. Stated another way, if the application server cannot communicate with the HSS 113 because it does not support the Sh interface, the OA & M 109 may be called upon to deliver the mobile station information directly to that application server.

The IMS application servers that receive the entry including mobile station information from the OA & M server 109 would then send an acknowledgement message for the successful creation of the record. If there was not successful creation of the record, an error message may be sent in its place. Finally, the OA & M server 109 would then return a message to the basestation owner with a confirmation of the successful addition of the mobile station numbers to the basestation's authorized list. Generally, this message may be sent in email form or a confirmation at the web portal 131.

The entry that was created for the mobile station 101, may also include an expiration parameter for temporary users. This may be useful if the basestation owner is having visitors come to his or her home for a short period of time. In that case one of the parameters could be an expiration date. Once that date is reached the entry will expire and be taken off the basestation's authorized list. In another embodiment the OA & M server 109 could track the expiration date and at the appropriate expiration time communicate via provisioning scripts to remove the subscriber entry that was initially created. In another embodiment, the entry could include a timer that allows authorization until the timer expires. After the timer expires the entry would be automatically deleted and the authorization to the basestation would no longer be granted.

After the mobile station 101 has been provisioned, it may attempt to register with the basestation 103 in which case the registration request would be sent to the basestation emulator and the SIP user agent. This message would then be communicated to the CSCF 115 and then to the MMAS 119. The MMAS 119 would then perform authentication calculations.

In one embodiment, authentication calculations include CAVE based authentication. Generally, the HLR/AuC 125 is involved in CAVE based authentication. CAVE based authentication is based on a CAVE algorithm and two shared keys. The Authentication-key (A-key) and the Shared Secret Data (SSD). The A-key is a 64-bit primary secret key known only to the mobile station 101 and the AuC. This key is stored in the mobile and is never shared with roaming partners. However, it is used in order to generate the SSD which may be shared with roaming partners. The SSD is a 128 bit secondary key that is calculated using the CAVE algorithm. During authorization AuC 125 and the mobile station 101 both calculate the SSD separately and if the keys match up authentication is approved and the mobile station 101 is allowed to register.

Figure 2:
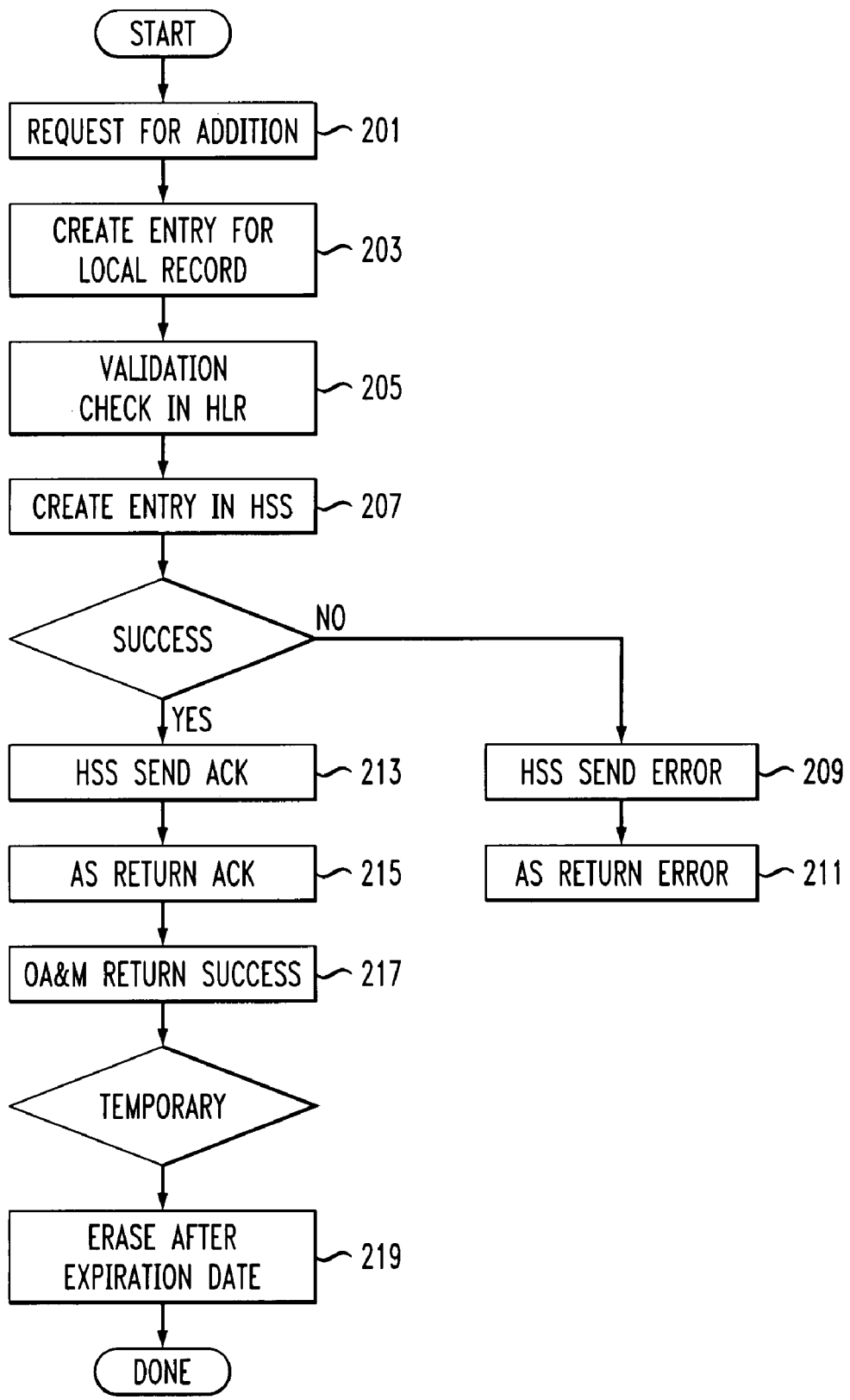
FIG. 2 is a flow chart illustrating one embodiment of mobile station provisioning according to the present disclosure.

Now referring to FIG. 2, which is a flow chart illustrating one of the embodiments of the method according to the present disclosure. This embodiment is drawn towards provisioning. It should be understood that suitable software/hardware implementation of the embodiments of the invention may be distributed on any or all of the appropriate network elements. The method disclosed here may be implemented through a variety of software and hardware configurations.

The method begins with a request for an additional mobile unit to be added to a basestation's authorization list. The owner of the basestation may enter the relevant information such as a cell phone number, (e.g. a mobile directory number), an Electronic Serial Number (ESN), IMSI, etc. through a web portal. Generally, the web portal will be a secure data session that will enter the information so that it may be managed by the OA and M server 109 in FIG. 1.

The method continues with creating an entry in the local record at step 203. This local record will authorize the newly added mobile phone 101 to be registered on the IMS network 135. The method continues at step 205 with a validation check at the HLR 125. This would be a check to see if the information given by the user on line matches the information in the HLR 125. This step may prevent fraud that may occur with the cloned mobile stations. If the information entered on the web page does not match the information in the HLR, registration would fail.

However, if the entry includes mobile station information, does match the information in the HLR 125, the OA & M 109 may then send the automatic provisioning script to the HSS (113 in FIG. 1). The HSS 113 would then create a record which will enable SIP services to work on the newly entered phone. If this entry creation was a success, the HSS 113 would send an acknowledgement message indicating such, as shown in step 213. However, if it is not a success, the HSS 113 may send an error message as shown in step 209. This error message would then be relayed to the application servers which would also return an error message and provisioning would not take place.

If the entry creation was successful the HSS 113 would send an acknowledgment message indicating so (at step 213) and that acknowledgement message would continue on to the application servers (at step 215). After the acknowledgement messages are received, the OA and M 109 would return an acknowledgement message as well.

If this is the case where the provision is temporary, the mobile station information which is entered as an entry may include a timer or expiration date which would signify when this provisioning information would expire should be taken out of the system. Once the expiration date/time is reached, the entry would be erased at (step 219) and access would no longer be allowed. In some embodiments there is no expiration date/time and the provision will continue until erased.

Figure 3:
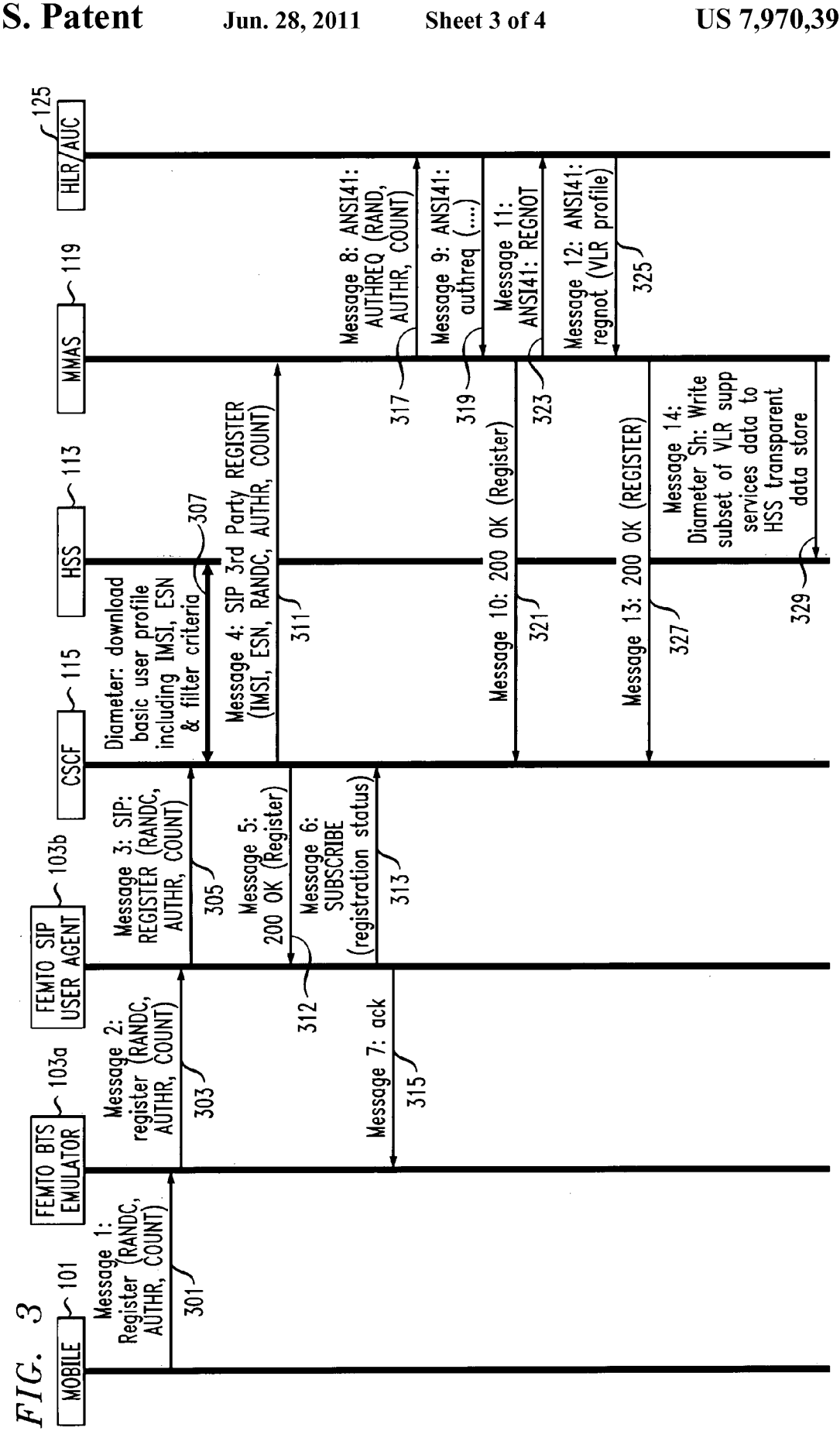
FIG. 3 is a flow chart illustrating another embodiment of a successful registration/authorization according to the present disclosure.

FIG. 3 is a flow chart illustrating one embodiment of the disclosed method. In this embodiment the registration/authorization onto the basestation 103 and access to the IMS 135 is allowed. The method begins with message 1 (at step 301) which is a registration message from the mobile to the basestation emulator 103a. In this embodiment, the basestation is a femto basestation which has a basestation emulator in order to communicate with a CDMA mobile. In this sense, the CDMA mobile technology will not undergo any significant change in order to communicate on the IMS network 135.

The method continues with message 2 which is a registration message with similar information sent from the basestation emulator 103a to the basestation user agent. The basestation user agent 103b is used in order to facilitate a translation from CDMA to SIP in order that the basestation may communicate with the IMS network 135.

Message 3 at step 305 is the user agent 103b sending the registration message in SIP to CSCF 115. This still contains the same information that was sent from the mobile requesting registration.

The method continues with a diameter download basic user profile which includes IMSI/ESN and filter criteria at step 307. This information is used in order to identify the mobile attempting registration and verify that the mobile is an authentic mobile trying to legitimately register on the network. This message also contains filter criteria which allows SIP services to work correctly for the user. SIP services include service provided by the MMAS 119, a hand-off application server, telephony application server, etc. Optionally, femtocell users are not provisioned for IMS authentication or use default IMS authentication data at HSS 113 for the femtocell. Generally, CDMA network authentication is sufficient for individual users.

The method continues with message 4 which is a SIP third party register message which send user identification information including the IMSI, ESN and the authorization and account information (at step 309). This message is sent from the CSCF 115 to the MMAS 119.

Message 5 (at step 311) includes a 200OK register message and message 6 (at step 313) includes subscriber registration status message. These are sent back and forth between the SIP user agent 103b and the CSCF 115.

The SIP user agent 103b sends an acknowledgement message, message 7 to the basestation emulator 103a (at step 315). This is an acknowledgement of the registration message that has been received by the proper application server.

The registration/authentication continues with message 9 (at step 317). This is a CDMA standards message, authorization request from the MMAS 119 to the HLR/AuC which houses the mobile station's information. The HLR/AuC then sends a message back at message 9 at step 319 including the key information necessary to calculation authenticate for the mobile.

Assuming that the authentication calculations were successful, and the mobile station 101 is attempting a legitimate login, a 200OK register message is sent from the MMAS 119 to the CSCF 115. Message 11 is a CDMA standards message for registration notification which is sent from the MMAS 119 to the HLR/AuC 125. In return, the HLR/AuC 125 sends the registration notification response with the Visitor Location Register (VLR) profile back to the MMAS 119 (at step 325). Finally, message 13 is sent (at step 327) from the MMAS 19 to the CSCF 115 and the MMAS 119 writes a subset of the VLR supplementary service data to the HSS.

Figure 4:
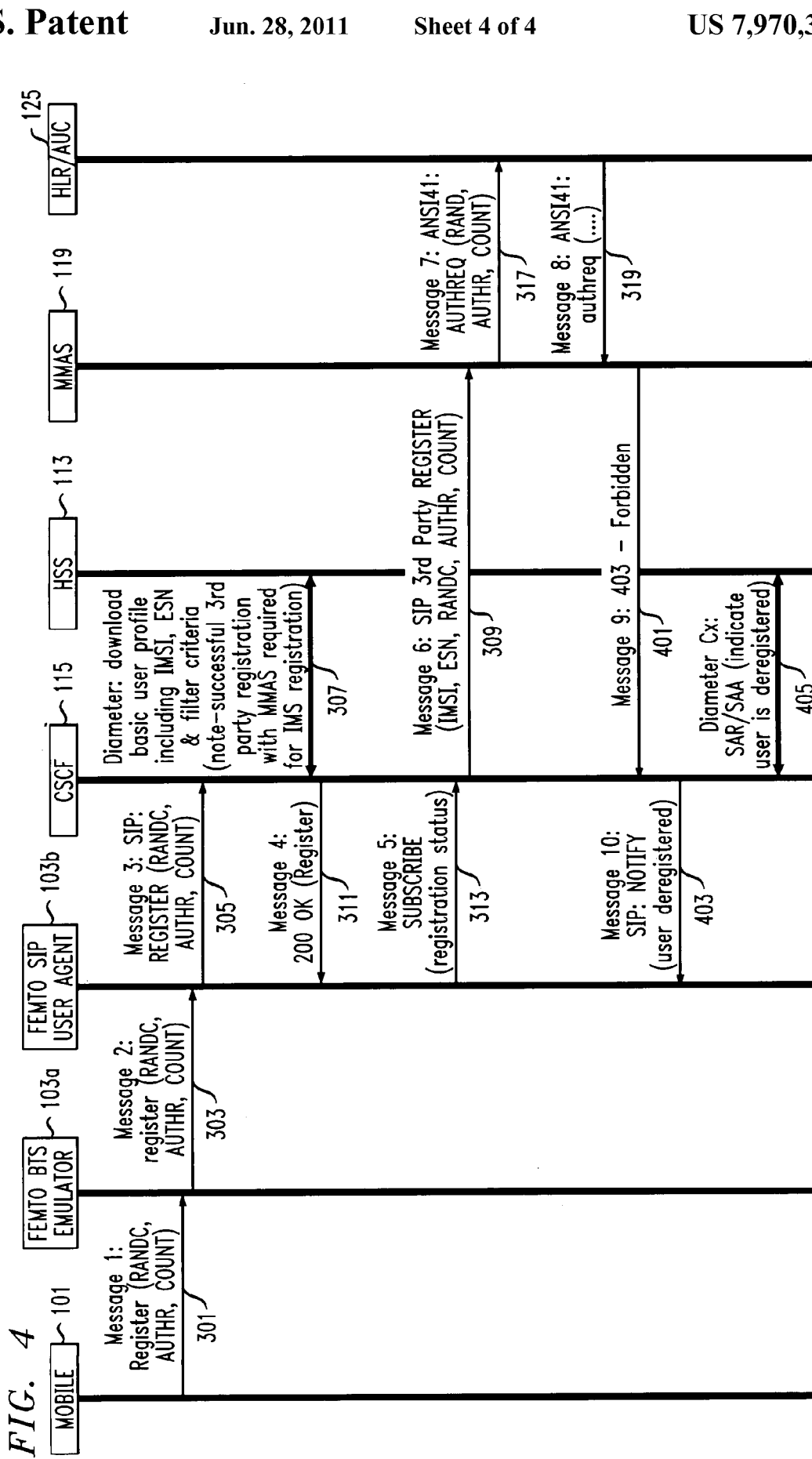
FIG. 4 is a flow chart illustrating another embodiment of a failed registration authentication for the method according to the present disclosure.

Now referring to FIG. 4 which is another embodiment of the proposed disclosure. In this embodiment the registration authentication has failed and registration is not allowed. Similar to FIG. 3, a user mobile tries to register on the basestation emulator 103a (at step 301). That message is relayed through messages 2 and 3 (at steps 303 and 305). Again, (at step 307), the diameter download, the basic user profile takes place.

At message 4, the 200OK register message is sent (at step 311) to indicate that the IMS registration is successful. The CDMA authentication and registration remains. In message 5 the SIP subscribe message is sent (at step 313) by the femtocell UA to request notification of changes in registration status for the user. Message 6, which is similar to FIG. 3, a SIP third party register message is sent to the MMAS 119 and the authorization request sent in CDMA at message 7 to the HLR/AuC 125. Message 8 returns the message back to the MMAS.

Assuming the authorization calculations have failed because the key did not match the MMAS 119 would send a 403 forbidden message to the CSCF 115. This would initiate a network based deregistration and drop any existing sessions.

At message 10 in SIP a notify message would be sent from the CSCF 115 to the femto SIP user agent 103b. This message would notify the base station that the user is deregistered. In some embodiments this would trigger a return to the macro cell and start a timer which would have to run its course before allowing another registration attempt by this mobile 101. Finally (at step 405), a diameter message would be sent indicating that the user is deregistered between the CSCF 115 and the HSS 113.

The above described embodiments that were shown in FIGS. 2-4 present but one embodiment of the above described disclosure. Implementation of these various network elements depends on how the system is used. These functions may be performed by some or all of the network elements in conjunction or separate from one another and variations may exist. Description of these embodiments is not meant to limit the claim but instead show how some embodiments of the method may be used.

The above description merely provides a disclosure of particular embodiments of the claimed invention and is not intended for the purposes of limiting the same. As such, the invention is not limited to only the above-described embodiments. Rather, it is recognized that one skilled in the art could conceive alternative embodiments that fall within the scope of the claims.

We claim:

1. A method for provisioning and registering a mobile station through an internet protocol multimedia subsystem network comprising:

receiving an addition request for addition of an authorization record from a user computer via a user interface in conjunction with provisioning for service from an internet protocol multimedia subsystem network to a select mobile station in relation to a select basestation, the addition request including mobile station information associated with the select mobile station and basestation information associated with the select basestation;

creating the authorization record for said select mobile station in relation to the select basestation in response to receiving the addition request, where said authorization record includes the mobile station information and the basestation information, the mobile station information comprising at least one of a mobile directory number and an international mobile subscriber identifier, the basestation information comprising a basestation identification number, where the authorization record combines the mobile station information and the basestation information to form a unique subscriber identity;

receiving a registration request including request information from said select mobile station via the select basestation to register the select mobile station for service from the internet protocol multimedia subsystem network; and determining successful registration of the select mobile station in relation to the select basestation with said internet protocol multimedia subsystem network based, at least in part, on said request information and the authorization record.

2. The method according to claim 1 wherein said mobile station information includes an electronic serial number for said mobile station.

3. The method according to claim 1 further comprising communicating the mobile station information and basestation information to one or more application servers within the internet protocol multimedia subsystem network that require independent subscriber data in conjunction with provisioning for network services to the select mobile station in relation to the select basestation from the corresponding application servers.

4. The method according to claim 1 wherein said authorization record includes filter criteria in conjunction with provisioning certain network services from the internet protocol multimedia subsystem network to the select mobile station via the select basestation, the filter criteria including relevant information to assure proper call processing for the select mobile station via the select basestation.

5. The method according to claim 1 wherein said select basestation is a femto basestation.

6. The method according to claim 1 wherein said user interface is through a web portal interface to a website associated with a service provider for access to the internet protocol multimedia subsystem network.

7. The method according to claim 1, further comprising:

determining successful registration of the select mobile station in relation to the select basestation with a corresponding mobile network through the internet protocol multimedia subsystem network based, at least in part, on the request information associated with the registration request and key information from a home location register by implementing CAVE-based authentication, the home location register being associated with the select mobile station and the mobile network.

8. The method according to claim 1 further comprising validating said mobile station information through a home location register in response to receiving the addition request and in conjunction with creating the authorization record, the home location register being associated with the select mobile station and a corresponding mobile network.

9. The method according to claim 1 wherein the addition request includes an expiration parameter relating to expiration of the authorization record such that the provisioning for service from the internet protocol multimedia subsystem network is temporary provisioning.

10. The method according to claim 9 further comprising tracking an expiration date associated with said temporary provisioning, wherein after the expiration date the authorization record is expired and registration of the select mobile station in relation to the select basestation fails.

11. The method according to claim 9 further comprising implementing a timer in conjunction with the temporary provisioning, wherein after the timer expires the authorization record is expired and registration of the select mobile station in relation to the select basestation fails.

12. A system for provisioning and registering a mobile station through an internet protocol multimedia subsystem network, comprising:

a basestation configured to receive code division multiple access signals from a mobile station and translate the code division multiple access signals to session initiation protocol signals to process calls associated with the mobile station through an internet protocol multimedia subsystem network, wherein the basestation also receives code division multiple access signals from the mobile station and translates the code division multiple access signals to session initiation protocol signals in conjunction with registration requests from the mobile station for service from the internet protocol multimedia subsystem network; and a management server configured to receive mobile station information and basestation information from a user computer via a user interface and provide corresponding subscriber identity information to the internet protocol multimedia subsystem network for creation of an authorization record for said mobile station in relation to the basestation in conjunction with provisioning for service from the internet protocol multimedia subsystem network and facilitating registration request processing in conjunction with call processing for said mobile station via said basestation through the internet protocol multimedia subsystem network, where the subscriber identity information includes a mobile station identity number and a basestation identity number and the authorization record combines the mobile identification number and the basestation identification number to form a unique subscriber identity.

13. The system according to claim 12, the internet protocol multimedia subsystem network comprising
a home subscriber server that stores said authorization record, the authorization record comprising filter criteria in conjunction with provisioning certain network services from the internet protocol multimedia subsystem network to assure proper call processing for the mobile station via the basestation.

14. The system according to claim 13 wherein the network services include hand off services.

15. The system according to claim 12 wherein said basestation is a femto basestation.

16. The system according to claim 12 further comprising
a home location register associated with the mobile station and a corresponding mobile network that stores subscriber information for use in validation of the mobile station information received from the user computer in relation creation of the authorization record.

17. The system according to claim 12 further comprising
an authentication center associated with the mobile station and a corresponding mobile network that facilitates authentication of said mobile station in conjunction with registering the mobile station in relation to the basestation for service from the internet protocol multimedia subsystem network.

18. A method for provisioning and registration of a mobile station through an internet protocol multimedia subsystem network comprising:
creating a secure data session between a user computer and a management server associated with a service provider for an internet protocol multimedia subsystem network;
receiving a request from said user computer via a user interface over said secure data session to add a select mobile station to a list of mobile stations authorized to register on a select basestation for service from the internet protocol multimedia subsystem network, where said select basestation is configured to facilitate communications for said mobile station to be processed and carried on the Internet protocol multimedia subsystem network;
creating a record for said select mobile station in relation to the select basestation in response to receiving the request in conjunction with provisioning for service from the internet protocol multimedia subsystem network to the select mobile station in relation to the select basestation;
creating a unique subscriber identity associated with the select mobile station and the select basestation that combines a mobile station identification number and a basestation identification number in a manner that can be decomposed and utilized by an application server in the internet protocol multimedia subsystem network in conjunction with provisioning for a network service from the application server to the select mobile station in relation to the select basestation;
receiving a request from said select mobile station via the select basestation to register the select mobile station for service from the internet protocol multimedia subsystem network in relation to said basestation; and
registering said select mobile station in relation to the select basestation with the internet protocol multimedia subsystem network and with a mobile network associated with the select mobile station if said request meets predetermined registration criteria associated with at least one of the record and the unique subscriber identity created in conjunction with the provisioning and key information from a home location register, the home location register being associated with the select mobile station and the mobile network.

19. The method according to claim 18 wherein said registering said select mobile station in relation to the select basestation includes implementing a CAVE algorithm to authenticate the select mobile station through the internet protocol multimedia subsystem network based at least in part the key information from the home location register.

20. The method according to claim 18 wherein creating the record includes establishing an expiration for the record and thereby includes creating a temporary record for provisioning of said mobile station.

* * * * *